United States Patent [19]

Fujita et al.

[11] Patent Number: 4,760,826

[45] Date of Patent: Aug. 2, 1988

[54] ENGINE THROTTLE VALVE CONTROL DEVICE

[75] Inventors: Nagahisa Fujita; Itaru Okuno; Tadashi Kaneko, all of Hiroshima, Japan

[73] Assignee: Mazda Motor Corporation, Hiroshima, Japan

[21] Appl. No.: 59,748

[22] Filed: Jun. 8, 1987

[30] Foreign Application Priority Data

Jun. 12, 1986 [JP] Japan ................. 61-137124

[51] Int. Cl.[4] .................. F02D 9/08; F02D 41/02
[52] U.S. Cl. .................... 123/399; 123/361
[58] Field of Search ........... 123/361, 399, 339, 585, 123/342, 340

[56] References Cited

U.S. PATENT DOCUMENTS

| 4,161,994 | 7/1979 | Collonia | 123/361 X |
| 4,475,503 | 10/1984 | Nakamura et al. | 123/361 X |
| 4,508,078 | 4/1985 | Takeuchi et al. | 123/399 |
| 4,538,579 | 9/1985 | Moriya et al. | 123/340 X |
| 4,592,322 | 6/1986 | Murakami et al. | 123/399 X |

FOREIGN PATENT DOCUMENTS

| 14834 | 2/1981 | Japan . | |
| 28838 | 2/1982 | Japan . | |
| 116140 | 7/1982 | Japan . | |
| 131336 | 8/1983 | Japan | 123/399 |
| 10749 | 1/1984 | Japan . | |
| 10750 | 1/1984 | Japan . | |
| 10751 | 1/1984 | Japan . | |
| 10752 | 1/1984 | Japan . | |
| 10753 | 1/1984 | Japan . | |
| 99045 | 6/1984 | Japan | 123/399 |
| 83461 | 4/1986 | Japan . | |
| 171846 | 8/1986 | Japan . | |
| 45952 | 2/1987 | Japan . | |

*Primary Examiner*—Tony M. Argenbright
*Attorney, Agent, or Firm*—Fleit, Jacobson, Cohn & Price

[57] ABSTRACT

Engine throttle valve control device having a step motor to operate a throttle valve which comprises detecting means for detecting the need for changing the rotational direction of the step motor, and delaying means which delays the supply of the drive signal to the step motor for a predetermined period when the need for changing the rotational direction of the step motor is detected by the detecting means. In the present invention, when it is necessary to change the rotational direction of the step motor, the step motor is not immediately driven to reverse the rotational direction but is halted for a predetermined short time. After the short time passes the step motor is driven to rotate in the opposite direction. According to the present invention, the inertial force acting on the step motor when it changes its rotational direction can be avoided or decreased. Hence, loss of control of the step motor due to the inertial force is avoided, and accurate control of the throttle valve opening is performed.

7 Claims, 6 Drawing Sheets

ENGINE THROTTLE VALVE CONTROL DEVICE

BACKGROUND OF THE INVENTION

1. Field of the Invention

The present invention relates in general to an engine intake system and more particularly to throttle valve control means. More specifically, the present invention pertains to engine throttle valve position control means having step motor means for moving the engine throttle valve to a desired position.

2. Description of Prior Art

Conventionally, an internal combustion engine has a throttle valve provided in an air intake passage to control the amount of intake air. For controlling the position or opening of the throttle valve in a precise manner, proposals have been made to use a step motor to operate the throttle valve. This kind of device is disclosed in, for example, Japanese Patent Public Disclosure Nos. 57-28838 and 57-116140. The control device disclosed in Japanese Patent Public Disclosure No. 57-116140 includes an accelerator position detector which applies a signal to a control circuit for controlling the step motor connected to the throttle valve according to the detected accelerator position.

In controlling the throttle valve using the step motor, however, there is a possibility of control of the step motor being lost due to an inertial force which appears on the throttle valve body during rotation thereof. More specifically, the step motor is driven to change its rotational direction when the accelerator pedal is depressed from a released position or released from a depressed position. When such a change of rotational direction occurs, the inertial force on the throttle valve tends to keep the throttle valve rotating in the same direction as it was, which force is strong where the step motor is driven at high pulse rates.

If the inertial force becomes greater than the driving torque by the step motor in the opposite direction, the step motor will fail to drive the throttle valve to the position corresponding to the position of the pedal possibly producing an uncontrolled condition. Under this conditions, the number of steps counted in the control circuit will not be equal to the actual steps of the step motor operation so that accurate control of the throttle valve position cannot be expected. Further, once the step motor falls into an uncontrolled condition, the torque of the motor will abruptly fall and in turn it will take much time to restore a normal motor operation, whereby excess delay of control will occur.

To avoid the above problem, the step motor may be driven at slower rates. However, this creates another problem of a dull response in throttle valve control, especially when under an acceleration wherein the step motor must be quickly driven to open the throttle valve in order to increase the engine speed from a steady operation.

SUMMARY OF THE INVENTION

It is therefore an object of the present invention to provide an engine throttle valve control having a step motor to operate the throttle valve, by which an accurate control of the throttle valve opening with a high response is performed.

Another object of the present invention is to provide an engine throttle valve control having a step motor to operate the throttle valve, in which loss of control of the step motor due to an inertial force is prevented to enable the step motor to operate the throttle valve appropriately.

To achieve the above objects, in the present invention, when it is necessary to change the rotational direction of the step motor, the step motor is not immediately driven to reverse the rotational direction but is halted at its angular position for a predetermined short time. After the short time passes the step motor is driven to rotate in the opposite direction. According to the present invention, the step motor is halted for the short period before changing its rotational direction, so that the inertial force acting on the step motor when it changes its rotational direction can be avoided or decreased. Hence, loss of control of the step motor due to the inertial force is avoided, and accurate control of the throttle valve opening is performed. The halt period can be selected according to the application.

In one aspect of the present invention, engine throttle valve control device is provided which comprises an accelerator position detecting means for detecting the amount of the operation of an accelerator pedal. A throttle opening determining means determines a desired throttle opening of the throttle valve in accordance with the detected amount of operation of the pedal. A pulse generating means generates a drive signal in the form of pulses for driving a step motor in response to the desired throttle opening. The drive signal is applied to the step motor which rotates to operate the throttle valve connected thereto, so that a desired throttle opening is obtained. Detecting means is further provided which detects the need for changing the rotational direction of the step motor. Delaying means is provided which delays the supply of the drive signal to the step motor for a predetermined short period when the need for changing the rotational direction of the step motor is detected by the detecting means.

In a preferred embodiment, the throttle opening determining means preferably comprises memory means in which a lookup table defining the relationship between the accelerator pedal position and the throttle opening is prestored. A desired throttle opening is obtained from the table using the detected pedal position. The need for changing in the rotational direction of the step motor can be detected by monitoring the change in the required throttle valve opening obtained from the amount of the operation or the position of the pedal. Preferably, such need is detected by sampling two throttle openings which are sequentially obtained, comparing them to find which is larger and which is smaller, and determining whether the larger one becomes the smaller one or vice versa. This invertion means that the need for the change in the rotational direction of the step motor is arised.

In another aspect of the present invention, an improved engine throttle valve control is provided which comprises accelerator position detecting means for detecting the operating amount of the accelerator pedal, throttle opening determining means for determining the desired throttle valve opening in response to the detected operating amount of said pedal, memory means for storing the current step number of a step motor for operating a throttle valve, pulse signal generating means for comparing said desired throttle valve opening and said step number stored in said memory means and generating a pulse signal for driving the step motor according to the result of said comparison, and a step motor connected to the throttle valve which is supplied with said pulse signal to drive and operates the throttle valve to position it to said desired throttle valve opening. The control further comprises detecting means for detecting the change in the rotational direction of the step motor. The detecting means detects that the desired throttle valve opening generated by the throttle opening determining means becomes one which indicates rotation of the step motor in the opposite direction. Further, the control has delay means which suspends the supply of the pulse signal from the pulse signal generating means to the step motor for a predetermined period to thereby halt the step motor at its angular position for that period.

Other objects and advantages of the present invention will become apparent upon reading the following detailed description and referring to the attached drawings.

DESCRIPTION OF THE PREFERRED EMBODIMENT

While the invention will be described in connection with a preferred embodiment, it will be understood that we do not intend to limit the invention to this embodiment. On the contrary, we intend to cover all alternatives, modifications, and equivalents as may be included within the spirit and scope of the invention as defined by the attached claims.

Figure 1:
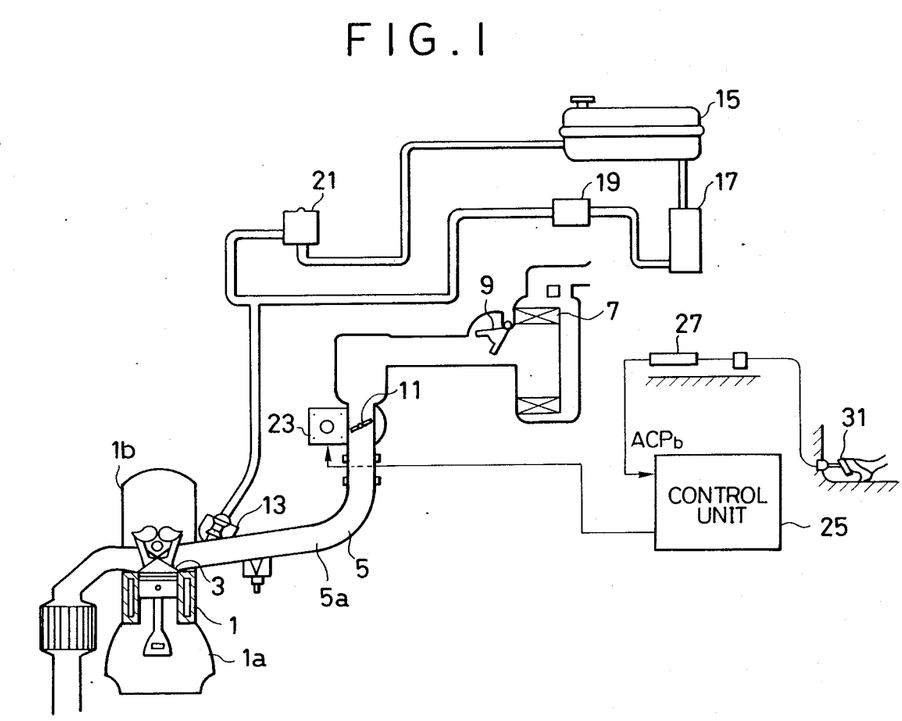
FIG. 1 shows a schematic view of an internal combustion engine in accordance with the present invention.

Referring now to the drawings, particularly to FIG. 1, there is shown an engine including an engine body 1 which consists of a cylinder block 1a and cylinder head 1b. An intake port 3 is formed in the cylinder head 1b and is connected with an intake pipe 5 defining an intake passage 5a. The intake passage 5a is provided with an air cleaner 7, an air flow meter 9 and a throttle valve 11 in this order from the upstream end of the passage. A fuel injection valve 13 is provided on the intake passage adjacent to the intake port 3 and is supplied with fuel through a fuel supplying system which includes a fuel tank 15, a fuel pump 17, a fuel filter 19, and a pressure regulating valve 21. The engine is of a conventional type and will not be described in further detail. The output shaft of a step motor 23 is connected to the throttle valve 11 and the step motor 23 is driven in open-loop operation by a control unit 25 to thereby operate the throttle valve to a desired opening position. An accelerator pedal position sensor 27 is provided. Output signal ACPb therefrom is supplied to an input port of the control unit 25. The accelerator pedal position sensor 27 detects the operating amount of the accelerator pedal 31 and outputs an electrical signal responsive to the detected amount.

Figure 2:
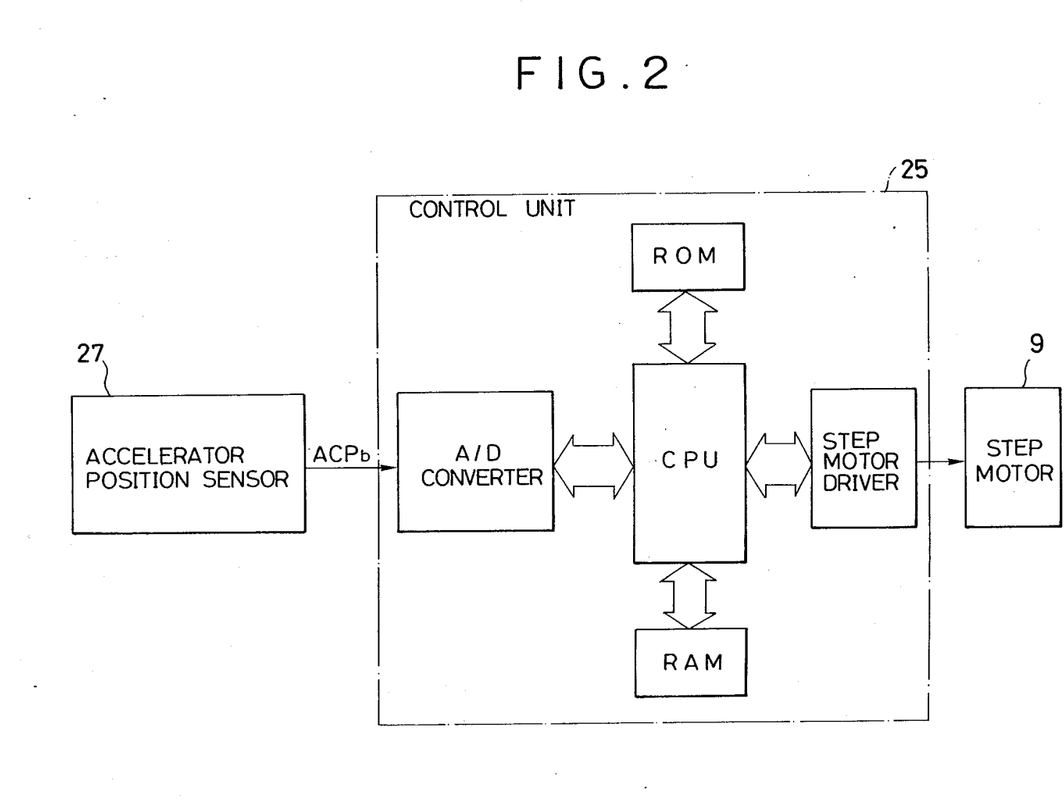
FIG. 2 shows a block diagram of a controlling system in the engine shown in FIG. 1.

As shown in FIG. 2, the control unit 25 can be constituted as a single chip microcomputer which includes a CPU, ROM and RAM, as is well known. The output ACPb from the sensor 27 is supplied through the input port to an A/D convertor which converts it into digital signals. The ROM has areas in which are stored a control program for driving the step motor, look-up tables for converting the output ACPb into a throttle opening and the throttle opening into a pulse signal to drive the step motor etc. The RAM has areas for flags and time counting which are used in carrying out the control programs. In accordance with the control program, the control unit 25 drives the step motor 23 by means of a step motor driver to thereby control the opening of the throttle valve 9.

Figure 3:
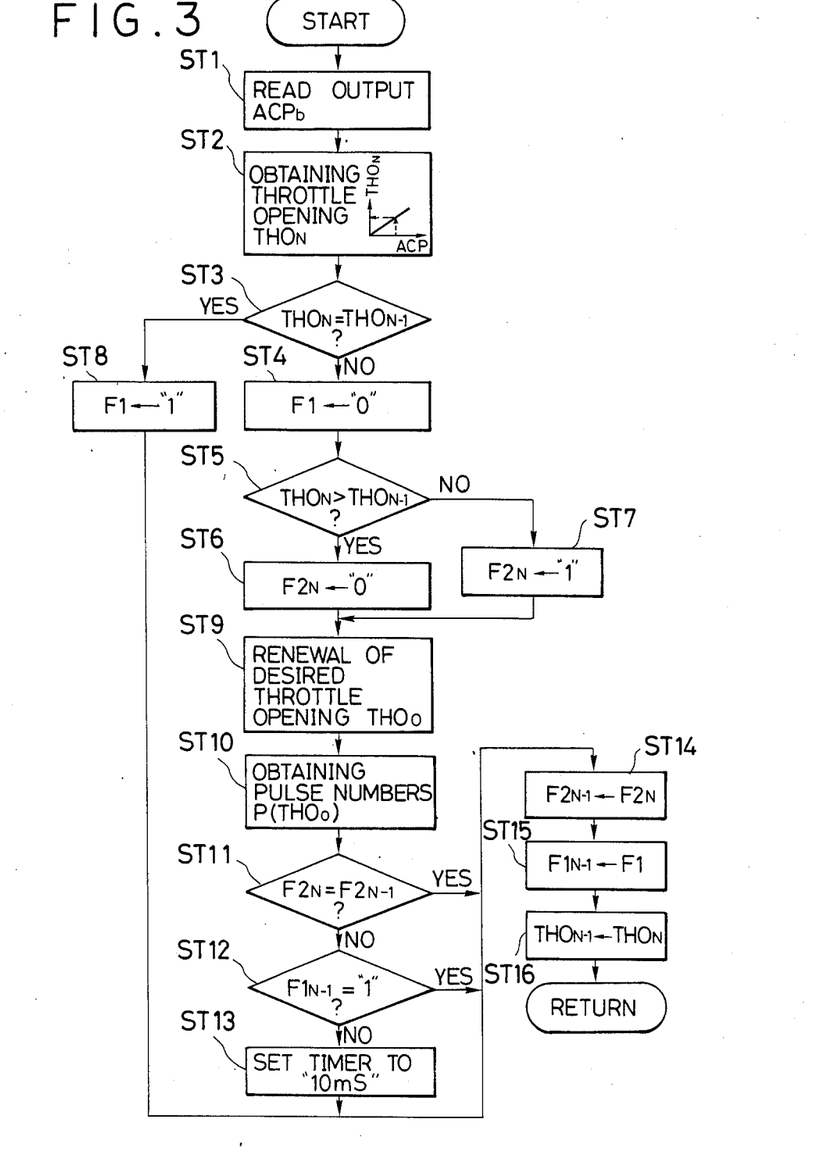
FIG. 3 is a general flowchart showing the operation of the throttle valve opening which is carried out by the system shown in FIG. 2.
Figure 4:
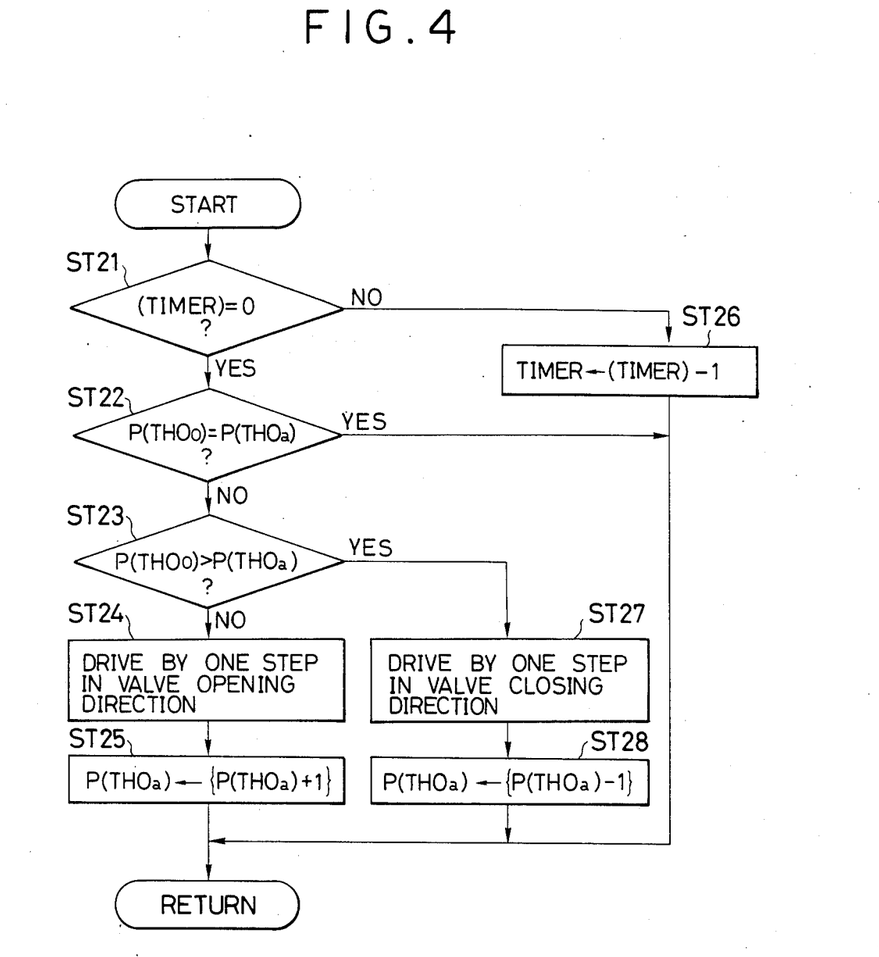
FIG. 4 shows a flowchart of the operation of the throttle valve when a need for a change in rotational direction of the step motor arises.
Figure 5A:
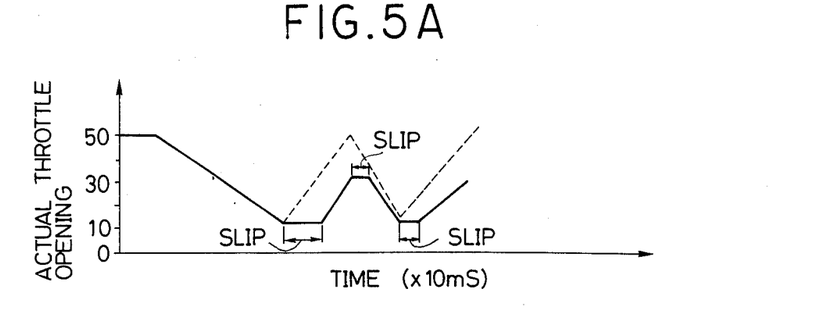
FIG. 5A, 5B and 5C are characteristic curves which show relationships between desired throttle openings and actual throttle openings.
Figure 5B:
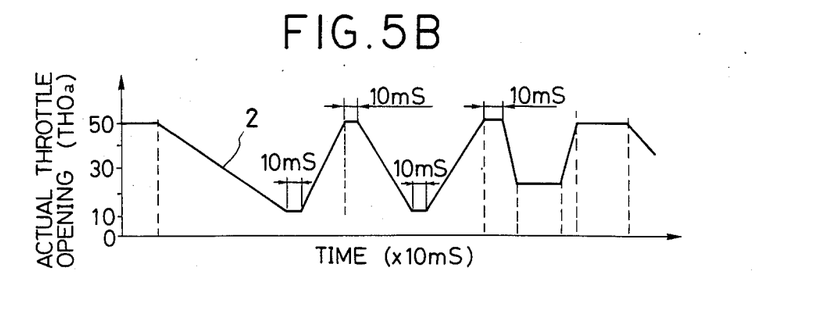
Figure 5C:
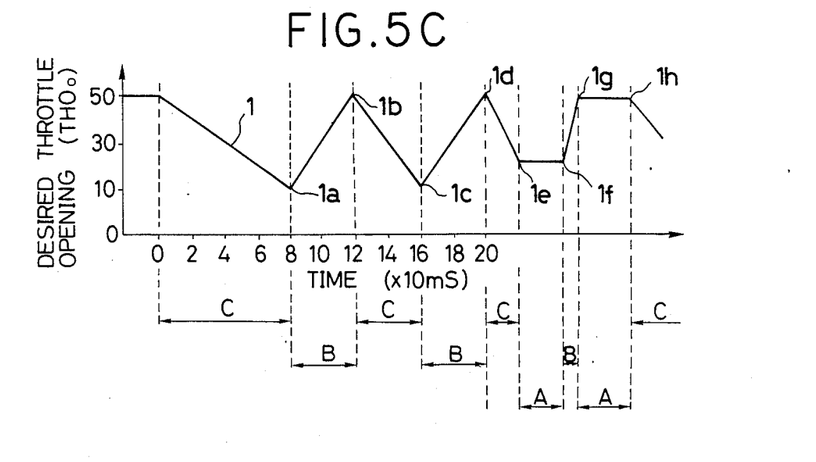

With reference to FIGS. 3, 4 and 5, the control of the step motor performed by the control unit will be described. FIG. 3 is a general flowchart of the operation by the control unit 25. In step 1, the output ACPb from the sensor 27 is read. In step 2, the look-up table defining the relationship between the ACPb and the required throttle valve opening is looked up by using the valve of ACPb to find the required throttle opening THOn. In steps 3 to 12, it is determined whether it is necessary for the step motor 23 to change its rotational direction. That is, the required throttle valve opening THOn obtained is compared with the opening THOn−1 which was obtained in the previous routine and stored in RAM, whereby a need for such change is detected. For this determination, in step 3 it is decided whether the value of THOn is equal to that of THOn−1. When it is equal to that of THOn−1 (the area A in FIGS. 5B and 5C), a flag F1 is set to "1" in step 8 and thereafter steps 14 to 16 are carried out sequentially. If the determination in step 3 is negative, the flag F1 is set to "0" in step 4 and it is then decided whether the value THOn is larger than the value THOn−1 in step 5. When the judgment is YES, a flag F2n is reset to "0" in step 6. Otherwise, the flag F2n is set to "1" in step 7. Thereafter, in either case, the obtained throttle valve opening THOn is stored in RAM instead of THOn−1 as a desired throttle valve opening THOo. In step 10, a pulse number P(THOo) is obtained by means of the look-up table stored in ROM.

Next, in step 11, it is determined whether the value represented by the flag F2 setting is equal to that of the flag F2n−1 setting. When it is equal, steps 14, 15 and 16 are carried out, and thereafter the next routine will be carried out. When F2n is equal to F2n−1, it means that the moving direction of the throttle valve is the same as before, (areas B and C in FIGS. 5B and 5C), so the pulse signal P(THOo) is immediately supplied to the step motor to drive it.

However, if F2n and F2n−1 are determined to be not equal in step 11, it is determined whether the value stored in the flag F1n−1 is "1", the flag F1n−1 indicating if the obtained throttle valve opening THOn−1 in the previous routine was equal to that obtained in routine prior to the previous routine. When the flag is "1", steps 14, 15 and 16 are carried out and the step motor is driven immediately, since in this case the change in the rotational direction does not occur as shown by points 1*f* and 1*h* in FIG. 5C.

If on the other hand a negative judgment is atained in step 12, a timer in RAM is set to 10 ms as a delay period. In this case, a change in the rotational direction of the step motor is required as shown by points 1a, 1b, 1c and 1d in FIG. 5C, and a pulse signal is supplied after the 10 ms is counted by the timer as shown in FIG. 4. Then, the steps 14, 15 and 16 are carried out and operations proceeds to the next routine.

FIG. 4 is a flowchart showing the operation of the step motor or the control of the throttle valve opening. In step 21, it is determined whether the value of the timer is zero. When the judgment is positive, it is decided in step 22 whether pulse number P(THOo) is equal to that of P(THOa). The P(THOa) is stored in RAM in response to the driving of the step motor by the unit 25. In other words, the unit 25 drives the step motor according to the P(THOa) indicating the current step numbers of the step motor. If the judgement is positive, the control is completed. If the judgment is negative in step 22, then it is determined whether the desired value of P(THOo) is larger than that of the opening P(THOa). If the valve.P(THOo) is larger, in step 27 one pulse is supplied to the step motor to rotate it one step in the direction of increasing the opening of the throttle valve. Thereafter, the value of P(THOa) is decremented by 1 in step 28. The same routine is repeated until the value P(THOa) becomes the same as P(THOo). Likewise, when the judgment is negative in the step 23, steps 24 and 25 are carried out to rotate the step motor by one step so as to make the value P(THOa) equal to the value of P(THOo).

On the other hand, when the judgment is negative in step 21, or the value stored in the timer is not zero, the loop from steps 21 to 26 is repeated to subtract 1 from the value stored in the timer in each loop until the value of the timer becomes zero. Thereafter, the judgment in the step 21 changes to positive and so the step 22 and the following steps are carried out to begin controlling the step motor as mentioned above. Thus, the step motor is controlled so that it halts for the predetermined delay period, 10 ms in this embodiment.

FIGS. 5B and 5C show the relationship between the actual and desired throttle valve openings in the present embodiment. A line 1 showing the desired throttle opening THOo has points 1a, 1b, 1c and 1d in which gradients of the line are inverted. Portions, which follow these points of line 2 showing the actual throttle opening, do not go up or down as the line 1 does, but form horizontal lines of 10 ms. In the present embodiment, as the step motor is controlled to halt for 10 ms before it reverses its rotation, the inertial force appearing when the step motor reverses its rotational direction can be decreased or avoided. Hence, the step motor will not fall into an uncontrolled condition upon the reversal of its rotation. Conversely, in the conventional system, the step motor is driven to reverse its rotation immediately when such a need is detected, which causes a large inertial force against the torque of the step motor being produced. This involves a risk of slip occuring in the step motor, as shown in FIG. 5A, precluding accurate control of the throttle valve opening by the system.

Figure 6:
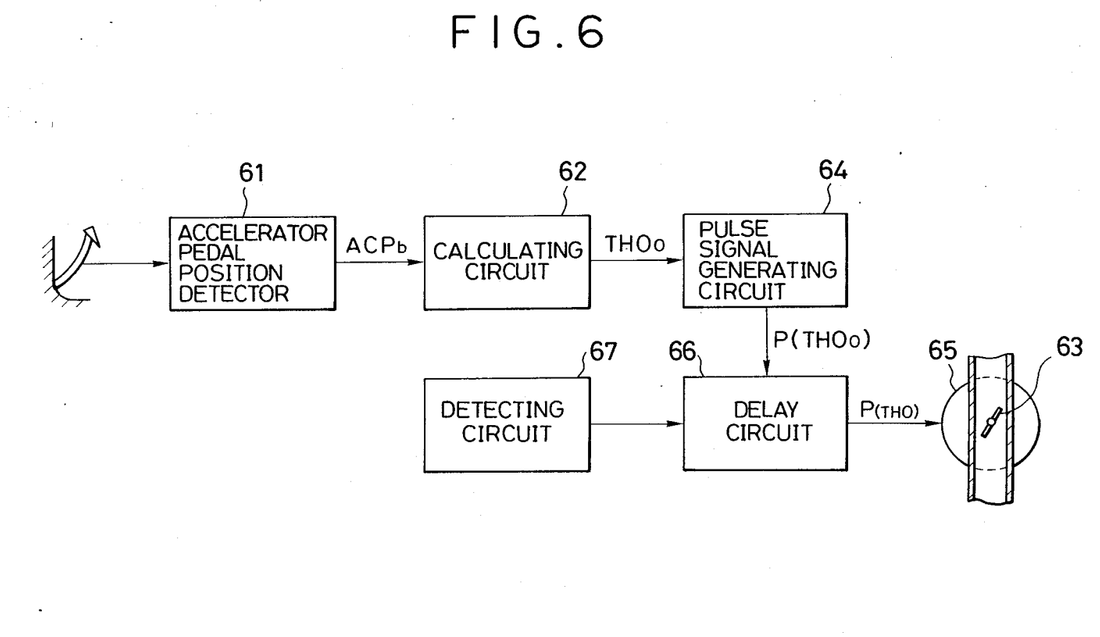
FIG. 6 shows an another embodiment of the controlling system according to the present invention.

The present invention may be embodied in the form of discrete circuits. One such embodiment is shown in Figure 6. The illustrated system includes an accelerator pedal position detector 61, a calculating circuit 62 for calculating the opening of a throttle valve 63, a pulse signal generating circuit 64 for generating a series of pulses to drive a step motor 65, a delay circuit 66 and a detection circuit 67 for detecting a need for reversing the rotation of the step motor 65. According to the present embodiment, the same effects and advantages can be attained as those in the above-mentioned embodiment.

We claim:

1. Engine throttle valve control device comprising accelerator position detecting means for detecting the amount of the operation of an accelerator pedal, throttle opening determining means for determining a desired throttle opening of the throttle valve in accordance with the detected amount of operation of the pedal, pulse generating means which generates a drive signal in the form of pulses for driving a step motor in response to the desired throttle opening, a step motor which is applied with said drive signal and rotates to operate the throttle valve connected thereto so that a desired throttle opening is obtained, detecting means for detecting the need for changing the rotational direction of the step motor, and delaying means which delays the supply of the drive signal to the step motor for a predetermined period when the need for changing the rotational direction of the step motor is detected by the detecting means.

2. The engine throttle valve control device as set forth in claim 1 in which said throttle opening determining means comprises memory means wherein a lookup table defining the relationship between the accelerator pedal position and the throttle opening is prestored so that a throttle opening is obtained from the table using the detected pedal position.

3. The engine throttle valve control device as set forth in claim 1 in which said detecting means for detecting the need for changing the rotational direction of the step motor detects said need by monitoring the change in the throttle valve opening obtained from the amount of the operation.

4. The engine throttle valve control device as set forth in claim 3 in which said detecting means conducts sampling of two throttle openings which are sequentially obtained and compares them to find which is larger and decides that there is said need when the larger one becomes the smaller one or vice versa.

5. Engine throttle valve control device comprising accelerator position detecting means for detecting the operating amount of the accelerator pedal, throttle opening determining means for determining the desired throttle valve opening in response to the detected operating amount of said pedal, memory means for storing the current step number of a step motor for operating a throttle valve, pulse signal generating means for comparing said desired throttle valve opening and said step number stored in said memory means and generating a pulse signal for driving the step motor according to the result of said comparison, and a step motor connected to the throttle valve which is supplied with said pulse signal to drive and operates the throttle valve to position it to said desired throttle valve opening, detecting means for detecting the need for change in the rotational direction of the step motor which detects that the throttle valve opening generated by the throttle opening determining means becomes one which indicates rotation of the step motor in the opposite direction, and delay means which suspends the supply of the pulse signal from the pulse signal generating means to the step motor for a predetermined period to thereby halt the step motor at its angular position for that period.

6. The engine throttle valve control device as set forth in claim 5 in which said throttle opening determining means comprises memory means wherein a lookup table defining the relationship between the accelerator pedal position and the throttle opening is prestored so that a throttle opening is obtained from the table using the detected pedal position.

7. The engine throttle valve control device as set forth in claim 5 in which said detecting means conducts sampling of two throttle openings which are sequentially obtained and compares them to find which is larger and decides that there is a said need when the larger one becomes the smaller one or vice versa.

* * * * *